(12) United States Patent
Williams, Sr.

(10) Patent No.: US 7,063,307 B2
(45) Date of Patent: Jun. 20, 2006

(54) SYSTEM AND STRUCTURE COMPRISING INTEGRATED VEHICLE LIFT SYSTEM

(76) Inventor: Andrew Williams, Sr., 32 Hillcrest Ave., Trenton, NJ (US) 08618

( * ) Notice: Subject to any disclaimer, the term of this patent is extended or adjusted under 35 U.S.C. 154(b) by 292 days.

(21) Appl. No.: 10/647,201

(22) Filed: Aug. 25, 2003

(65) Prior Publication Data

US 2005/0045859 A1   Mar. 3, 2005

(51) Int. Cl.
  *B60S 9/02*   (2006.01)
(52) U.S. Cl. .................................. 254/423
(58) Field of Classification Search .............. 259/923, 259/918, 93 H, 93 R
  See application file for complete search history.

(56) References Cited

U.S. PATENT DOCUMENTS

| | | |
|---|---|---|
| 3,938,780 A | 2/1976 | Hauptman |
| 4,174,094 A * | 11/1979 | Valdespino et al. ......... 254/423 |
| 4,542,882 A | 9/1985 | Choe |
| 4,560,145 A | 12/1985 | Widmer |
| 5,224,688 A * | 7/1993 | Torres et al. ............... 254/423 |
| 5,441,237 A | 8/1995 | Sweeney |

* cited by examiner

*Primary Examiner*—Robert C. Watson
(74) *Attorney, Agent, or Firm*—William L. Muckelroy; Art Lessler; Gary Lipson

(57) ABSTRACT

An improved integrated combination of an automobile and jack structures attached to the reinforced lift points on each side of the automobile adjacent its wheel wells is a rigid orthogonally telescoping housing which includes a plurality of jacks, each jack having telescoping interconnected cylinders containing a valve sealed expandable pneumatic plenum within the housing, wherein the pneumatic interconnected cylinders are arranged for selective inflation by use of a pneumatically connected 12 volt DC pneumatic compressor that in turn is operative through an electrical supply line that is hard wired to an electrical system or battery of the automobile to receive electrical energy. A set of control switches is electrically connected to each of the compressors wherein each selected corner of the automobile can be lifted by a separate telescoping housing. A valve assembly in each compressor and housing assembly permits selective inflation and deflation of a pneumatic telescoping structure adjacent to a wheel well.

6 Claims, 4 Drawing Sheets

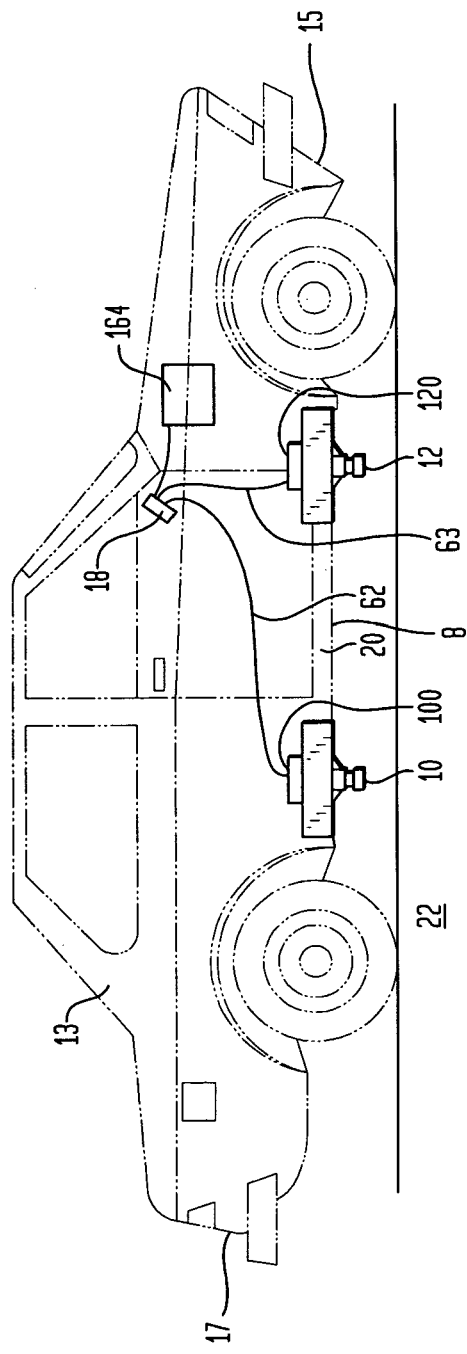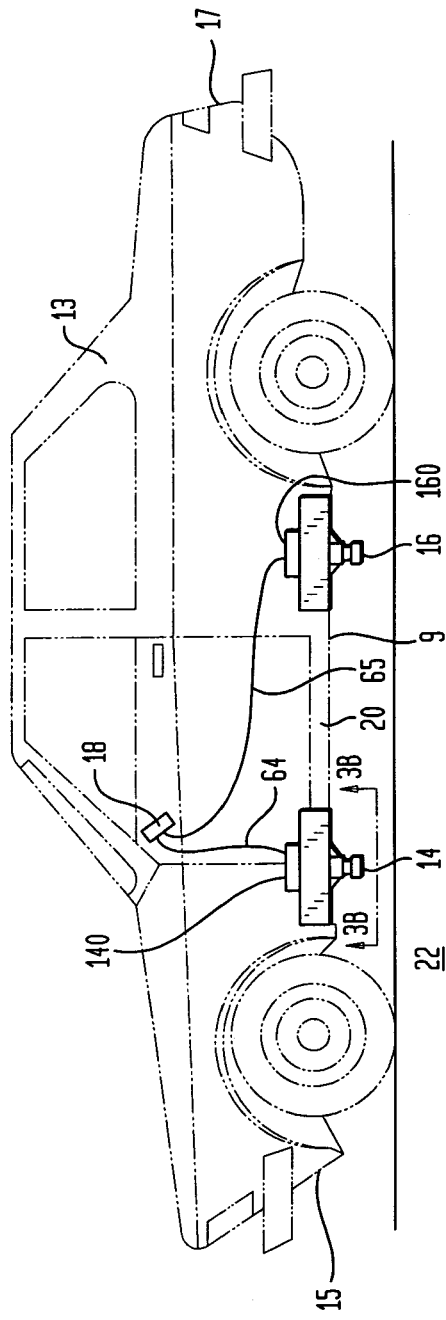

SYSTEM AND STRUCTURE COMPRISING INTEGRATED VEHICLE LIFT SYSTEM

BACKGROUND OF THE INVENTION

1. Field of the Invention

The field of the invention relates to a new improvement in an automobile by incorporating a pneumatic jack structure at each corner of the lower frame, and more particularly pertains to a new and improved vehicle wherein the same employs four stacked pneumatic flexible chambers, each positioned within a housing attached to a point on the perimeter of the structural frame of the vehicle to permit a jack to effect lifting of a corner of the automobile.

2. Description of the Prior Art

In 1995, Sweeney was issued U.S. Pat. No. 5,441,237 for an external pneumatic lift jack powered by a cigarette socket connection to an automobile. Sweeney is limited in its scope to a pneumatic jack structure, and more particularly pertains to a pneumatic vehicle jack wherein the same employs stacked pneumatic flexible chambers positioned within a housing permitting the housing to effect lifting of an associated vehicle by manually placing the jack and housing underneath the vehicle. This structure is an example of a non-integrated external means for lifting one corner of an automobile and is incorporated into this specification by reference.

Other pneumatic jack structures of various types have been employed in the prior art as exemplified by the U.S. Pat. Nos. 4,542,882; 5,121,900; 5,184,930; 3,993,286; and 5,232,206. The jack structures of the prior art have heretofore been non-integrated structures as in the manner of U.S. Pat. No. 4,542,882 which teaches a non-integral bag arranged to receive pressurized air from an exhaust system into a single flexible bag structure.

OBJECTS OF THE INVENTION

It is accordingly a primary object of this invention to provide a lift system that is integrated into the supporting frame of an automobile as a displacement for all types of separate trunk-stored conventional hydraulic, scissors, and ratcheting jacks.

It is an object of the present invention to provide a combination of an automobile and an integrated lift system capable of lifting and supporting the automobile above each of its four wheels.

It is an object of the present invention to provide an integrated four point automobile life system which is unparalleled in safety, eliminating the risk of lifting an automobile with a jack that can be expelled from underneath the automobile.

It is an object of the invention to provide an improvement in automobile lift structures capable of lifting a plurality of the wheels supporting the automobile.

Heretofore, various approaches have been devised to address the need in the marketplace for a means to easily solve the problem of fixing a flat tire in a neat efficient way. To this end, tires have been improved to incorporate means for resisting puncture such as by employing steel belting, means for self-sealing a puncture such as by incorporating a resin coating on the inside surface of a tire which mends itself when air exits at a puncture point, and more recently with a combination of a means for jacking the vehicle at the flattened wheel using a trunk housed pneumatic jack powered by a plug inserted into a cigarette lighter socket and a trunk housed pneumatic lug wrench also powered by a car battery accessed via the cigarette lighter. In the latter scenario, valuable trunk cargo space similar to that used to house prior generation CD players is taken up by the trunk stored pneumatic jack. Moreover, in the circumstance of dual flat times, the jack must be set up at one point underneath the automobile and then at a second point for the second flat tire. It is thus a primary object of the invention to eliminate the need to use trunk space to store a pneumatic jack and to provide a means for selectively automatically pneumatically lifting all four corners of a vehicle for changing tires, rotating tires, and for periodic home safety inspections of the components of the vehicle viewable from underneath.

SUMMARY OF THE INVENTION

The novel structure of the present invention is a combination of a four wheeled automobile having a support frame supported by four inflatable tires and four integral pneumatic jacks attached to and integrated into each of four corners of the support frame to selectively lift each of the four corners of the automobile. Each of the integral pneumatic jacks is separately electrically powered using a 12 volt DC source such as a car battery.

BRIEF DESCRIPTION OF THE DRAWINGS

These and other features, aspects, and advantages of the present invention will become better understood with regard to the following description, appended claims, and accompanying drawings wherein:

FIG. 1 is a right side view of the invention integrated into a right structural lowermost support frame part of an associated automobile.

FIG. 2 is a left side view of the invention integrated into the left structural lowermost support frame part of the associated automobile.

DESCRIPTION OF THE PREFERRED EMBODIMENT

Figure 3A:
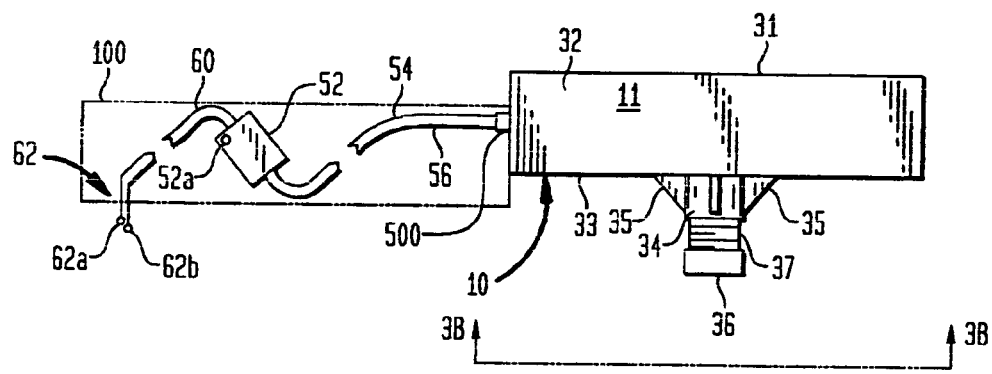
FIG. 3a is a graphic side view of one of the pneumatic lifts showing a connection to a pneumatic pump.

The present invention will be described hereinafter with reference to the accompanying drawings, which illustrate a preferred embodiment of the invention. As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The combination invention of an improved automobile incorporates a plurality of pneumatic jacks, one for each wheel of the automobile or vehicle, such as the pneumatic vehicle jacks 10 and 12 on the right side of a vehicle 13 as indicated in FIG. 1 and the pneumatic jacks 14 and 16 as indicated in FIG. 2 on the left side of the vehicle 13. Each of the jacks 10, 12, 14, and 16 has connected thereto an associated interconnection box 100, 120, 140, and 160, respectively. Each of the jacks 10, 12, 14, and 16 is permanently affixed underneath the vehicle 13 by welding to a structural frame 20. The vehicle 13 is shown in FIG. 1 and FIG. 2. As shown, the vehicle 13 has at least three wheels and an underside or structural frame 20. The structural frame 20 has a first edge 9 as shown in FIG. 1 and a second edge 11 as shown in FIG. 2. As shown in FIGS. 1 and 2, the vehicle 13 has a front end 15 and a back end 17. The first edge 9 of the structural frame 20 is located between the jack 10 and the jack 12 and between two of the wheels. The vehicle 13 as shown has an inflatable tire mounted on each of the wheels. Two of the wheels with inflatable tires thereon are spaced apart by the first edge 9. Another two of the wheels are spaced apart by a second edge 11. Each of the jacks 10, 12, 14, and 16 is arranged for extension to a supporting surface 22. Each of the jacks 10, 12, 14, and 16 is adapted and designed to extend to the surface 22 below the vehicle 13, such that upon actuation of any one of the jacks 10, 12, 14, and 16 the vehicle 13 is lifted above the surface 22 permitting access below the vehicle and to various activities such as tire changing and the like.

In FIG. 3a there is shown in detail one of the replicated jacks 10, 12, 14, and 16, namely the jack 10. The jack 10 has a rigid housing 11. With a cylindrical sidewall, the jack 10 has a continuous pneumatic cylinder 32 with a cylindrical sidewall, a bottom wall 33, and a top wall 31 made of steel and welded to the frame 20 (as shown in FIGS. 1 and 2). Orthogonally mounted to the bottom wall 33 is a support tube 34 employing gussets 35 to insure rigidity of the jack 10 when in use. A ground or surface support plate 36 adapted to make contact with the surface 22 (shown in FIGS. 1 and 2) is provided. The support plate 36 may be of a general surface size and configuration for supporting the weight of the vehicle 13.

There is also shown in FIGS. 1 and 2 an integrated electrical control and switching module 18 mountable and/or integratable on a dashboard or otherwise inside a cockpit of an automobile. The module 18 has an electrical terminal 62 comprising positive and negative terminals 62a and 62b adapted to receive the mating terminals 62a and 62b (shown in FIG. 3c) extending from the interconnection box 100. The module 18 connects to a car battery 164 and/or the electrical output of the automobile.

Figure 3B:
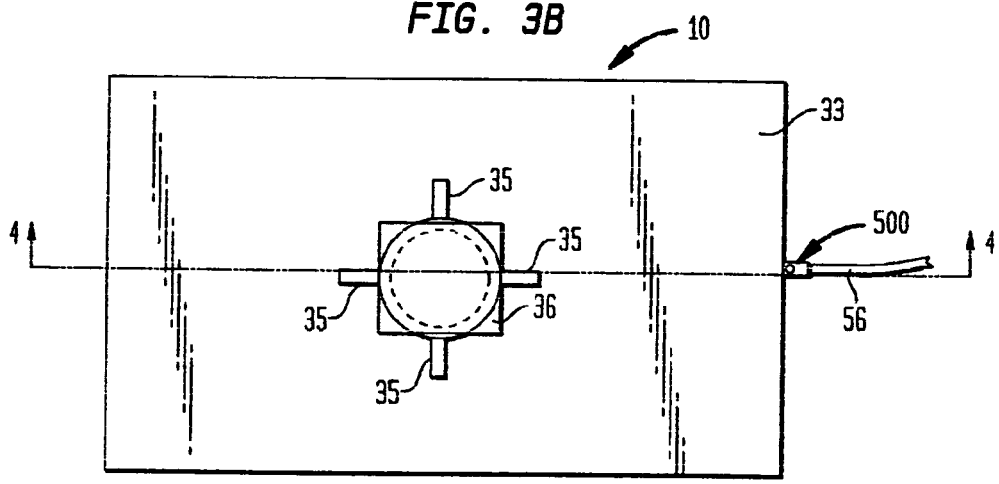
FIG. 3b is an orthographic plan view of one of the pneumatic lifts, taken along the lines 3b–3b' of FIG. 3a in the direction indicated by the arrows.
Figure 3C:
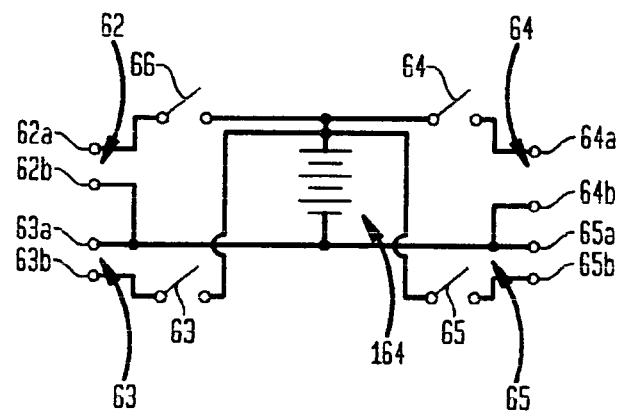
FIG. 3c is a circuit diagram for a central dashboard control panel of switches connecting a car battery or an equivalent to each of four pneumatic pumps.

Shown in FIG. 3c is a diagram of the circuitry for the module 18, further showing the terminal 63 comprising positive and negative terminals 63a and 63b adapted to receive the mating terminals 63a and 63b that extend from the interconnection box 120. Also illustrated in FIG. 3c is the terminal 64 comprising positive and negative terminals 64a and 64b adapted to receive the mating terminals 64a and 64b of connector 64 that extend from the interconnection box 140. The terminal 65 comprises positive and negative terminals 65a and 65b adapted to receive the mating terminals 65a and 65b of connector 65 that extend from the interconnection box 160.

The preferred geometry for the support plate 35 is approximately round or oblong and the size should be at least 100 square centimeters for a vehicle 13 weighing about 2000 pounds to be lifted with one or more jacks on a composite asphalt surface 22.

As further shown in FIG. 3a, the support plate 36 for each jack is fixedly and orthogonally secured to a plate tube 37. And, as shown in greater detail in FIG. 4, the support plate 36 is permanently affixed or welded to the plate tube 37, which is threadedly received within the support tube 34.

Figure 4:
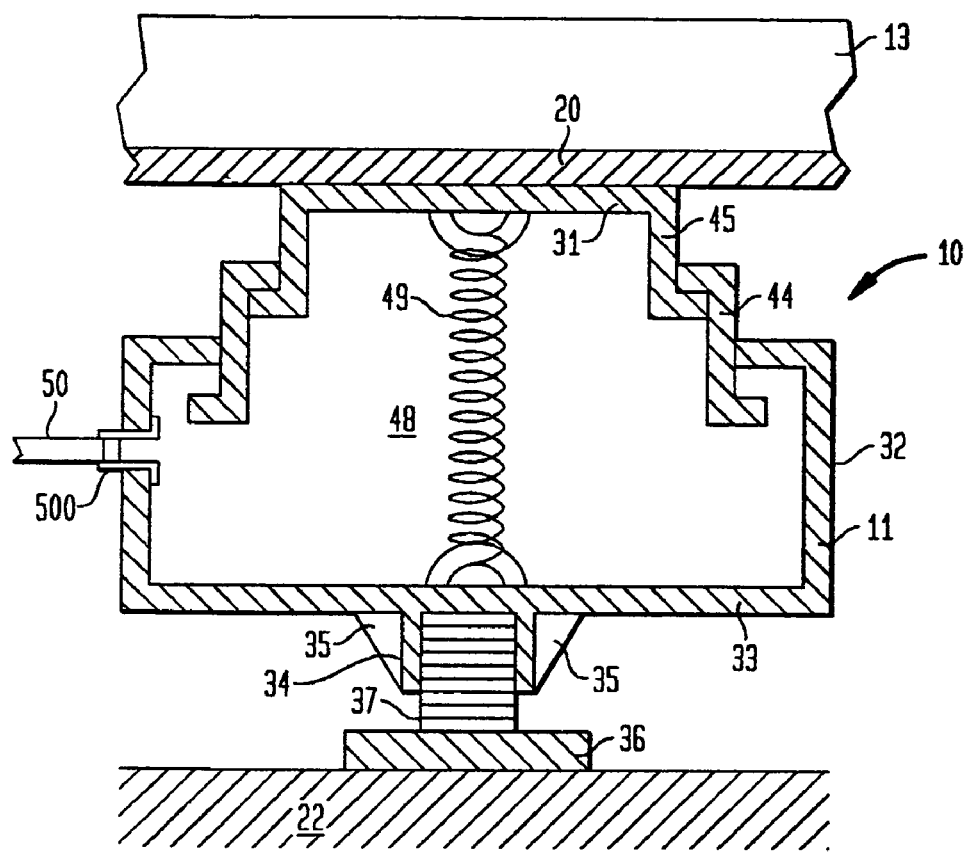
FIG. 4 is an orthographic view, taken along the lines 4–4' of FIG. 3b in the direction indicated by the arrows.

First and second internally connected pneumatic cylinders 44 and 45 are telescopically connected cylindrical sidewalls wherein the outer side of the cylinder 44 is telescopically connected to the sidewall of the cylinder 32 as illustrated in FIG. 4.

Internally, a plenum 48 contains a vertical return spring 49 connecting the cylinder 32 to the cylinder 45. The spring 49 retracts the cylinders 32 and 44 as the plenum 48 is emptied via a tube 50.

In the unexpanded position shown in FIGS. 1, 2, and 3, the pneumatic cylinders 44 and 45 are positioned within the jack 10. Shown in FIG. 4, upon pumping of fluid or gas to the plenum 48 via the entry high pressure reinforced flexible tube 50, the plenum 48 expands telescopically extending the cylinders 44 and 45 as well as the bottom wall 33 of the cylinder 32. As the plate 36 presses the surface 22, the vehicle 13 is lifted.

A pneumatic compressor 52 is provided with a pneumatic conduit 54. The conduit 54, a high pressure reinforced flexible tube, extends from the pneumatic compressor 52 to a valve assembly 56 that directs pneumatic pressurized air to the first and second pneumatic cylinders 44 and 45 as well as to the cylinder 32 through the tube 50 (see FIG. 5). A two wire electrical DC power supply cord 62 extends between a 12 volt battery 164 via an electrical switch 66 and the pneumatic compressor 52.

Figure 5:
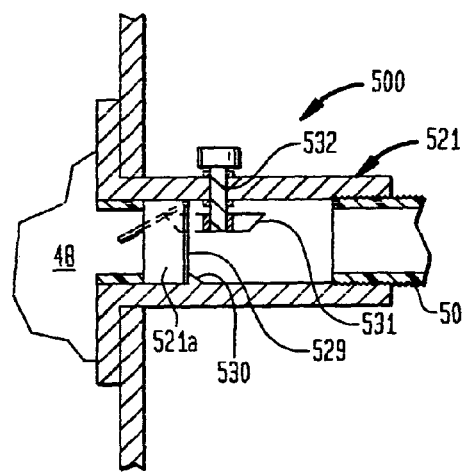
FIG. 5 is an enlarged orthographic view of a structure 500 as shown in FIG. 4.

In FIG. 5 there is shown a check valve 500 connected to the tube 50. The valve 500 has a check valve plate 529 pivotally mounted within the valve assembly's conduit 521a. To prevent pressurized air from being directed from the plenum 48 back through the valve assembly 521 to the pneumatic tube 50 is a plate abutment 530 positioned within the valve assembly conduit 521a between the plate 529 and the pneumatic tube 50. In this manner, pressurized air from the plenum 48 engages the plate 529 preventing such pressurized air from exiting. To permit release of air from the plenum 48, a rotary release shaft 532 is provided and positioned between the plate 529 and the pneumatic tube 50 such that the rotary release shaft 532 is spaced a predetermined length from the plate 529. A shaft foot 531 is fixedly and orthogonally mounted to the release shaft 532, having a foot length greater than the predetermined length such that upon rotation of the release shaft 532, the shaft foot 531 engages the plate 529 and displaces the plate relative to the abutment 530, such as indicated in phantom in FIG. 5, to permit pressurized air to be released from the plenum 48 through the conduit 521a for ultimate release through a relief opening 52a within the compressor 52.

Figure 6:
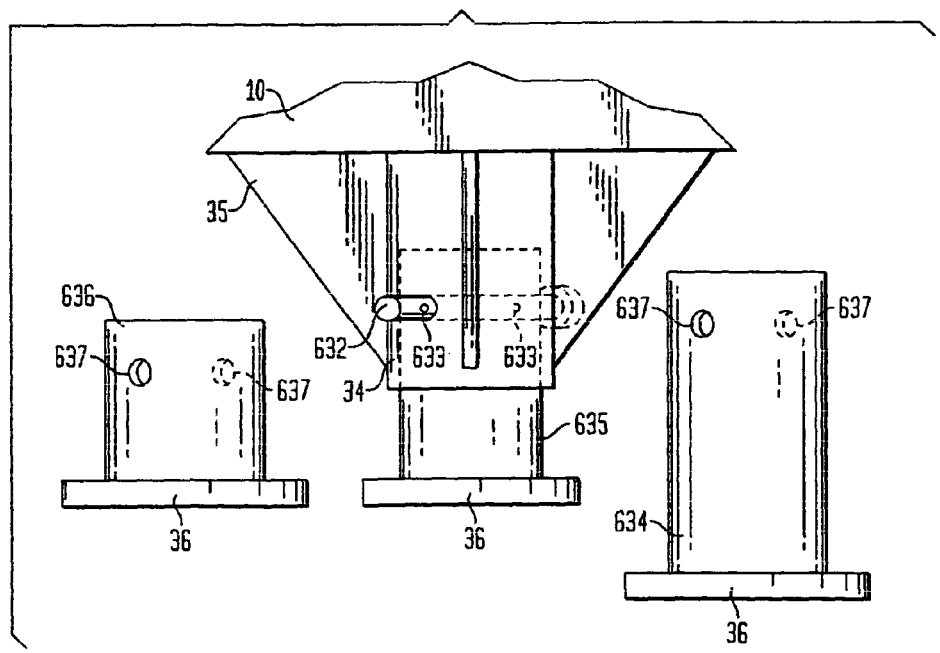
FIG. 6 is an orthographic view of a plurality of supporting plate tubes employed by the invention.

FIG. 6 shows in further detail the use of the support tube 34 having aligned tube bores 633 to receive a lock pin 632, that in turn is received through replacement plate support tubes defined by a first, second, and third plate tube 634, 635, and 636 respectively, with the first plate tube 634 having a first length, the second plate tube 635 having a second length less than the first length, and the third plate tube 636 having a third length less than the second length to provide for selective adjustment and substitution to accommodation of vehicles of varying ground clearance, with each of the plate tubes 634, 635, and 636 having respective aligned bores 637 for selective mounting within the support tube 34 in lieu of the primary plate tube 37 (shown in FIG. 4) that is threadedly received within the support tube 34.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

As this invention may be embodied in several forms and utilize each of many kinds of lifting and/or jacking systems without departing from the spirit or essential characteristics thereof, the present embodiment shown is, therefore, illustrative and not restrictive, since the scope of the invention is defined by the appended claims and the doctrine of equivalents rather than by the description preceding them, and all changes that fall within the metes and bounds of the claims or that form their functional as well as conjointly cooperative equivalent steps are, therefore, intended to be embraced by those claims.

| PARTS LIST | |
|---|---|
| pneumatic vehicle jack | 10 |
| housing | 11 |
| pneumatic vehicle jack | 12 |
| vehicle | 13 |
| pneumatic jack | 14 |
| pneumatic jack | 16 |
| interconnection box | 100 |
| interconnection box | 120 |
| interconnection box | 140 |
| interconnection box | 160 |
| structural frame | 20 |
| supporting surface | 22 |
| cylinder | 32 |
| bottom wall | 33 |
| top wall | 31 |
| support tube | 34 |
| gusset | 35 |
| plate | 36 |
| spring | 49 |
| control and switching module | 18 |
| outlet tube | 60 |
| terminal | 62 |
| terminal | 62a |
| terminal | 62b |
| battery | 164 |
| terminal | 63 |
| terminal | 63a |
| terminal | 63b |
| terminal | 64 |
| terminal | 64a |
| terminal | 64b |
| connector | 64 |
| switch | 65 |
| terminal | 65a |
| terminal | 65b |
| plate tube | 37 |
| support tube | 34 |
| pneumatic cylinder | 44 |
| pneumatic cylinder | 45 |
| plenum | 48 |
| tube | 50 |
| compressor | 52 |
| opening | 52a |
| conduit | 54 |
| valve assembly | 56 |
| electrical switch | 66 |
| check valve | 500 |
| check valve plate | 529 |
| conduit | 521a |
| valve assembly | 521 |
| plate abutment | 530 |
| shaft foot | 531 |
| release shaft | 532 |
| tube bores | 633 |

| -continued | |
|---|---|
| PARTS LIST | |
| lock pin | 632 |
| first plate tube | 634 |
| second plate tube | 635 |
| third plate tube | 636 |
| aligned bores | 637 |

What is claimed is:

1. In an apparatus comprising an automobile having at least three wheels and an underside, the underside comprising a structural frame, the automobile having a front end and a back end, the automobile further having an inflatable tire mounted on each of two of the wheels, the two wheels with inflatable tires thereon spaced apart, an improvement comprising an integral means for selectively pneumatically independently raising the front end or the back end of the automobile, the integral means further comprising a first separate means for selectively pneumatically independently lowering the front end and a second separate means for selectively pneumatically independently lowering the back end of the automobile, wherein the integral means for selectively pneumatically independently raising either the front end or the back end of the automobile further comprises a rigid housing, the housing having a telescoping side wall, a top wall, and a housing bottom wall positioned in a facing relationship relative to the housing top wall, with at least one selectively sealable pneumatic plenum positioned within the housing between the housing bottom wall and the housing top wall, and a compressor, and power supply means directed to the compressor for effecting actuation of the compressor, and a pneumatic conduit directed from the compressor to a valve assembly, the valve assembly directing pressurized air from the compressor through the pneumatic conduit to the pneumatic plenum, and a support tube fixedly and orthogonally mounted to the housing bottom wall, with a plate adjustably received within the support tube; the valve assembly including a valve conduit directed therethrough in pneumatic communication with at least one selectively sealable pneumatic plenum and the pneumatic conduit, the improvement further including a rotary relief shaft rotatably received within the valve assembly and extending into the valve assembly conduit to permit selective depressurization of each selectively sealable pneumatic plenum.

2. An apparatus as set forth in claim 1 further comprising a retracting means for retracting the housing bottom wall.

3. An apparatus as set forth in claim 2 wherein the retracting means comprising a spring means for springingly retracting the housing bottom wall.

4. An apparatus as set forth in claim 3 further comprising a housing top wall attachment means for attaching the spring means to the housing top wall and a housing bottom wall attachment means for attaching the spring means to the housing bottom wall.

5. An apparatus as set forth in claim 4 wherein each selectively sealable pneumatic plenum is comprised of a plurality of interconnected telescoping members.

6. An apparatus as set forth in claim 5 wherein each interconnected telescoping member is a sealable pneumatic chamber with adjacent pneumatically sealed sidewalls.

* * * * *